Dec. 6, 1955  C. R. A. GRANT  2,725,741
TESTING DEVICE FOR FLUID PRESSURE GAUGES
Filed April 9, 1954
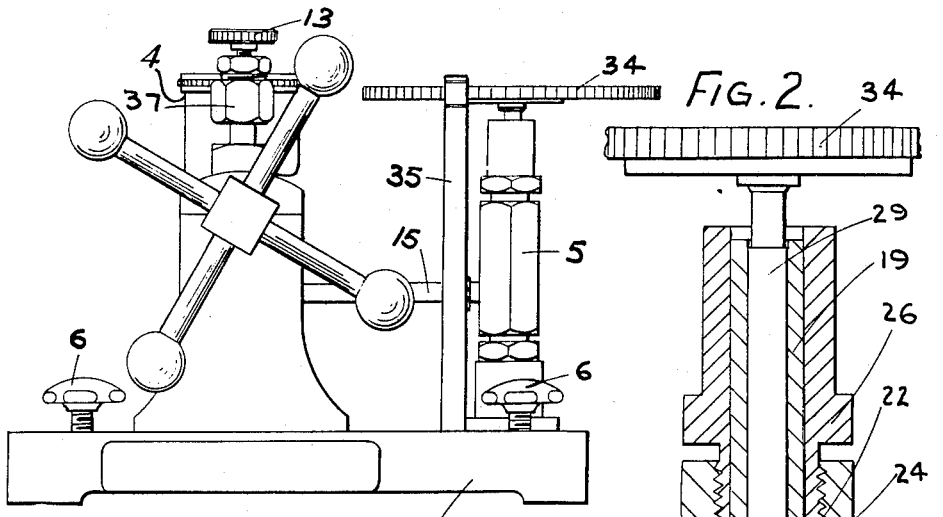
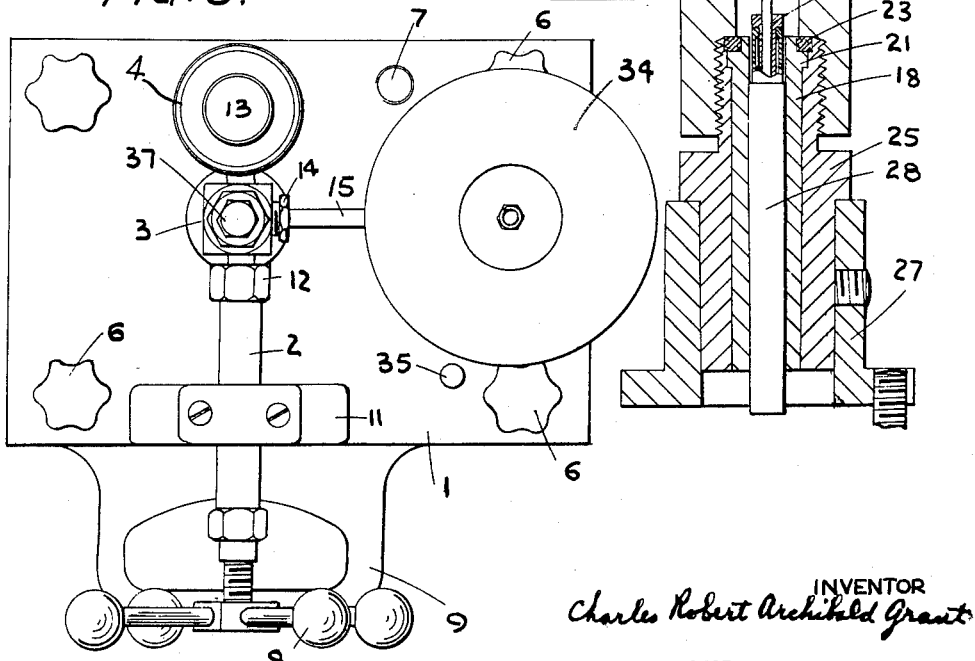
INVENTOR
Charles Robert Archibald Grant
PER
Stevens Davis, Miller & Mosher
his ATTORNEY United States Patent Office 2,725,741
Patented Dec. 6, 1955

2,725,741
TESTING DEVICE FOR FLUID PRESSURE GAUGES

Charles Robert Archibald Grant, London, England, assignor to Pressure Gauges Limited, Dublin, Ireland Application April 9, 1954, Serial No. 422,184

Claims priority, application Great Britain April 9, 1953

5 Claims. (Cl. 73—4)

This invention relates to testing devices for fluid pressure gauges. These testing devices are known usually as dead weight testers and comprise a vertically arranged piston and cylinder device on which a weight is placed to act on the fluid in the cylinder, the pressure developed in the cylinder being determined by the weight applied per unit cross sectional area of the piston. Where a high pressure is required the applied weight is unduly heavy for a piston for very small cross section rendering the arrangement cumbersome and mechanically weak.

The present invention relates to the kind of dead weight tester intended to indicate high pressures and comprising a pair of piston and cylinder units of different effective diameter, the cylinders being rigidly mounted and the pistons mechanically interconnected so that a weight applied to the pistons acts on the difference of the piston areas, making the tester mechanically strong and enabling moderately sized weights to be used for high pressure. My prior British Patent No. 596,043 describes and claims an improved form of this kind of testing device.

In this kind of testing device no means are normally provided for errors arising from expansion of the pistons and cylinders due to variations in temperature and the size of the possible error is not inappreciable if great accuracy is desired. Where the range of temperature over which the testing device is used is appreciable, for example —20° to +50° centigrade, errors approaching 0.1% could occur at the ends of the range. The present invention has for its object to compensate for the errors arising due to variation in temperature.

In accordance with the present invention in a testing device of the kind referred to the two piston and cylinder units are each of materials having different thermal coefficients of expansion, the materials being so selected that the difference in the effective cross sectional areas remains substantially constant over the working range of temperatures.

If T and B are the diameters of the two pistons, i. e. the effective diameters of the piston and cylinder units, $a_1$ is the temperature coefficient of expansion of the piston having diameter T and $a_2$ is the temperature coefficient of expansion of the piston having diameter B then T $(1+a_1 t)$ is the increased value of diameter T at a temperature $t$ and B $(1+a_2 t)$ is the increase in value of diameter B at temperature $t$.

If the increases in the areas of the pistons are equated to one another so that their difference is constant then it can be shown that (1) $$\frac{T^2}{B^2}=\frac{a_2}{a_1}$$

to the first order of approximation.

As an example of the use of the invention, a construction of testing device as shown in the above-mentioned British Patent No. 596,043 is employed, the pistons being connected by a flexible link. This gauge is constructed for measuring high pressures of the order of 8,000 pounds per square inch and for this purpose the piston diameters T and B are respectively 0.28001 inch and 0.24998 inch giving a differential area of 0.0125 square inch, these measurements all being made at a predetermined reference temperature. A weight of 100 pounds placed on the upper piston in this construction will indicate 8,000 pounds per square inch. Assuming that the material of which both pistons and cylinders are made is tempered steel having a temperature coefficient of expansion per 0c of 0.0000122 then at 30° C. above the reference temperature the difference D in the piston areas will have increased from 0.0125 square inch to .0125 $(1+2\times0.0000122\times30)$, i. e. an increase of .0732%.

From the Formula 1 above it can be shown in this case for there to be no error that the ratio $$\frac{a_2}{a_1}=1.25469034$$

Thus assuming that the piston having diameter B is of tempered steel with the coefficient of expansion given above it can be shown that the piston with diameter T should have a temperature coefficient of expansion of 0.00000972. Having reached this point a metal or other hard-wear resisting material is selected having this coefficient of expansion and the piston and cylinder having the diameter T are made of this metal or material. It may not be possible to select a metal or material having the exact coefficient of expansion and in this case a metal or material having an approximate coefficient of expansion may be chosen. An alloy of nickel and steel having 50% nickel has a coefficient of expansion of 0.0000097 and is suitable in the example given above.

It is not difficult to reduce the error to a very small fraction of its original value by selecting metal or materials for the piston and cylinder units having the ratio of temperature coefficient of expansion as determined by Formula 1.

Whilst reference has been made to the use of this invention in respect of the testing device of my prior British Patent No. 596,043 it will be appreciated that it may apply to any testing device of the kind referred to.

In order to explain the invention clearly a deadweight tested in accordance with the invention is described by way of example only in the accompanying drawings, in which:

Figures 1 and 3 are elevation and plan of the complete tester and

Figure 2 is a cross section of the high pressure differential piston and cylinder unit of Figures 1 and 3.

The deadweight tester of Figures 1 and 3 comprises a base 1 on which a high pressure pump 2, hydraulic connecting post 3, reservoir 4 and differential piston and cylinder unit 5 are mounted. The base 1 is fitted with four adjusting screws 6 and a bubble level indicating gauge 7 so that the base may be accurately set up on any surface to occupy a level position. The pump 2 is of the screw operated single stroke variety, the screw being operated by means of capstan handle 8 to generate hydraulic pressure. Adjacent the pump handle a portion of the base is formed as a fixed handle 9 by which the base may be held steady when the pump handle 8 is rotated. The pump is carried by a support 11 extending upwardly from the base so that the pump is horizontally disposed. The end of the pump 2 connects directly to the hydraulic connecting post 3 by a union 12. At the rear of the post 3 a reservoir 4 is mounted which feeds directly in the post 3. A needle valve having an operating knob 13 acts when screwed down to prevent liquid flow between the reservoir and the post. A union 14 on the post 3 secures a pipe 15 extending to the differential piston and cylinder unit 5. This piston and cylinder unit 5 comprises a body 16 having a bore 17 at the opposite ends of which cylinders 18 and 19 are secured in a fluid tight manner by means of flanges 21 and 22 respectively on the inner ends of the cylinders, sealing rings 23 and 24 and screw threaded locking sleeves 25 and 26 respectively. The locking sleeves extend the whole length of the cylinders to support the latter along their length and the lower sleeve 25 is used to mount the whole unit 5 on the base by means of a hollow mount 27. In the cylinders 18 and 19, pistons, respectively 28 and 29, are slidably located, each piston being an accurate fit in its cylinder and extending substantially its whole length to reduce leakage to a minimum. The cylinder and piston 19 and 29 having the largest diameters are located at the top. The two pistons 28 and 29 are interconnected by a wire 31 secured into each piston by collets 32 and 33. The upper piston and cylinder 29 and 19 are made of a metal or alloy having a lower coefficient of expansion than the lower piston and cylinder 28 and 18 and if the dimensions are taken as those of the example given above, the upper piston and cylinder will be made of nickel steel having a coefficient of expansion of 0.0000097 whilst the lower piston and cylinder will be made of steel having a coefficient of expansion of 0.0000122. It will be appreciated that each cylinder is secured in position by endwise clamping on the flange 21 or 22 by the sleeve 25 or 26 and that these sleeves are not a tight fit around the cylinders allowing them room for expansion without restriction.

The upper piston includes a weight pan 34 secured to its upper end by which endwise loading may be applied. An indicator post 35 secured to the base serves to indicate the position of the weight pan when it is not resting and must be entirely supported by liquid pressure. In the rest position when liquid pressure in the system is not sufficient to raise the weight pan the lower end of piston 29 rests on an abutment 36 in the bore 17. A union 37 on the top of the connecting post serves for connection of a gauge to be tested. In the connecting post all unions are interconnected by passages so that pressure applied by the pump is applied to the gauge under test and the differential piston and cylinder unit.

In use, a gauge is connected to union 37 for calibration and a weight representing a certain pressure is placed on the weight pan. With valve 13 open the pump handle 8 is unscrewed to fill itself with liquid from the reservoir. Valve 13 is then closed to isolate the reservoir and the pump handle is screwed up until the weight pan lifts to a position where it is level with the marks on the rod 35.

The weight pan is rotated by its knurled edge causing the pistons to rotate to overcome friction and allow the correct pressure defined by the weight acting over the differential of the piston areas to be generated and applied to the gauge under test. It will be appreciated that the link acts in tension, the tension being considerably greater than the applied weight.

I claim:

1. A deadweight tester including a body having a bore therein, said bore adapted to be connected to a gauge to be tested and containing pressure transmitting fluid, a pair of piston and cylinder units of different internal diameters rigidly mounted in said body substantially coaxially at opposite ends of said bore and each piston being slidable in its respective cylinder, a mechanical interconnection between the pistons and means for applying a predetermined endwise loading to one piston, said piston and cylinder units being made of materials having differing coefficients of expansion so that the differential of the effective areas of the piston and cylinder units remains constant over a range of temperature change.

2. A deadweight tester as claimed in claim 1 wherein the mechanical interconnection is a flexible tension link between the pistons.

3. A deadweight tester as claimed in claim 2 including means for mounting the piston and cylinder units with axis vertical and the unit having the larger diameter at the top and wherein the means to apply endwise loading comprises a weight pan mounted on the upper piston.

4. A deadweight tester as claimed in claim 3 including a pump and a reservoir connected to the bore in the body and a valve to isolate the reservoir.

5. A deadweight tester as claimed in claim 1 wherein one piston and cylinder unit is of steel and the other piston and cylinder unit is of nickel steel.

References Cited in the file of this patent

UNITED STATES PATENTS

| | | |
|---|---|---|
| 664,806 | Bosworth | Dec. 25, 1900 |
| 1,154,018 | Hopkins | Sept. 21, 1915 |
| 1,670,124 | Reed | May 15, 1928 |
| 2,529,170 | Mennesson | Nov. 7, 1950 |

FOREIGN PATENTS

| | | |
|---|---|---|
| 596,043 | Great Britain | Dec. 24, 1947 |